United States Patent
Yu et al.

(10) Patent No.: US 8,391,617 B2
(45) Date of Patent: *Mar. 5, 2013

(54) EVENT RECOGNITION USING IMAGE AND LOCATION INFORMATION

(75) Inventors: Jie Yu, Rochester, NY (US); Dhiraj Joshi, Rochester, NY (US); Jiebo Luo, Pittsford, NY (US); Wei Hao, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 1149 days.

This patent is subject to a terminal disclaimer.

(21) Appl. No.: 12/264,277

(22) Filed: Nov. 4, 2008

(65) Prior Publication Data

US 2010/0111428 A1   May 6, 2010

(51) Int. Cl.
   *G06K 9/62*   (2006.01)
   *G06K 9/72*   (2006.01)
   *G06K 9/46*   (2006.01)
(52) U.S. Cl. .................. 382/224; 382/229; 382/190
(58) Field of Classification Search ............. 706/601; 701/213, 211, 214, 208, 209; 382/305, 190, 382/224, 228; 348/231.3, 231.2
   See application file for complete search history.

(56) References Cited

U.S. PATENT DOCUMENTS

| 6,691,032 B1 * | 2/2004 | Irish et al. ............ 701/213 |
| 2003/0198390 A1 * | 10/2003 | Loui et al. ............ 382/224 |
| 2006/0277188 A1 * | 12/2006 | Irish et al. ............ 707/10 |
| 2007/0110338 A1 * | 5/2007 | Snavely et al. ........... 382/305 |
| 2007/0115373 A1 * | 5/2007 | Gallagher et al. ........ 348/231.3 |

OTHER PUBLICATIONS

NLP—Canada Center for Remote Sensing, Sep. 2007.*
NLP—Carleer et al.—Assessment of Very High Spatial Resolution—Oct. 2004.*
NLP—gizmodo.com—flying-the-sr+71-black.*
Jiebo Luo et al.: "Event Recognition: Viewing the World With a Third Eye", Proceeding of the 16th ACM International Conference on Multimedia, [Online], Oct. 26, 2008, pp. 1071-1080, XP002563907, Retrieved from the Internet: URL: http://portal.acm.org/citation.cfm?id=1459574> [retrieved on Jan. 18, 2010], the whole document, in particular Section 3.4. "Event Recognition Using Both Views".
B. Chandrasekaran et al.: "What are Ontologies, and Why Do We Need Them?", IEEE Intelligent Systems, vol. 14, No. 1, Jan. 1999, pp. 20-26, XP002563908, p. 23, Section "Task Dependence of Ontologies".
Toni Navarrete: "Semantic Integration of Thematic Geographic Information in a Multimedia Context", Jun. 2006, Ph.D. Thesis, University Pompeu Fabra, Barcelona, XP002563909, pp. 201-251, the whole document.

* cited by examiner

*Primary Examiner* — Chan S Park
*Assistant Examiner* — Ha Le
(74) *Attorney, Agent, or Firm* — Raymond L. Owens (57) ABSTRACT

A method of recognizing an event depicted in an image from the image and a location information associated with the image is disclosed. The method includes acquiring the image and its associated location information; using the location information to acquire an aerial image(s) correlated to the location information; identifying the event using both the image and the acquired aerial image(s); and storing the event in association with the image for subsequent use.

8 Claims, 8 Drawing Sheets

EVENT RECOGNITION USING IMAGE AND LOCATION INFORMATION

CROSS-REFERENCE TO RELATED APPLICATIONS

Reference is made to commonly assigned U.S. patent application Ser. No. 12/022,361, entitled "Recognizing Image Environment from Image and Position" by McIntyre et al.

FIELD OF THE INVENTION

The present invention relates to the recognition of the event depicted in an image by combining image content and location information associated with the location where the image was taken.

BACKGROUND OF THE INVENTION

Using a computer to analyze and discern the meaning of the content of digital media assets, known as semantic understanding, is an important field for enabling the creation of an enriched user experience with these digital assets. One type of semantic understanding in the digital imaging realm is the analysis that leads to identifying the type of event that the user has captured such as a birthday party, a baseball game, a concert, and many other types of events where images are captured. Typically, events such as these are recognized using a probabilistic graphic model that is learned using a set of training images to permit the computation of the probability that a newly analyzed image is of a certain event type. An example of this type of model is found in the published article of L.-J. Li and L. Fei-Fei, *What, where and who? Classifying events by scene and object recognition*, Proceedings of ICCV, 2007.

An aerial image co-located with an image taken on the ground by personal cameras contains complementary information which can be used as additional semantic information for event recognition. The main advantage is that aerial images are free of distraction and clutter which is often an adverse factor for computer vision algorithms. It is helpful to recognize the environment of an image (using aerial images) for event recognition. Incorporating inference from aerial images for event recognition requires fusion of information from the two modalities.

SUMMARY OF THE INVENTION

In accordance with the present invention, there is a method of recognizing an event depicted in the image and a location information associated with an image, comprising:

a) acquiring the image and its associated location information;

b) using the location information to acquire an aerial image correlated to the location information;

c) identifying the event using both the image and the acquired aerial image(s); and d) storing the event of the image in association with the image for subsequent use.

Features and advantages of the present invention include using an aerial image associated with the location information of an image to achieve a better understanding of the type of environment of an image to help predict the event or activity depicted in the image.

DETAILED DESCRIPTION

Figure 1:
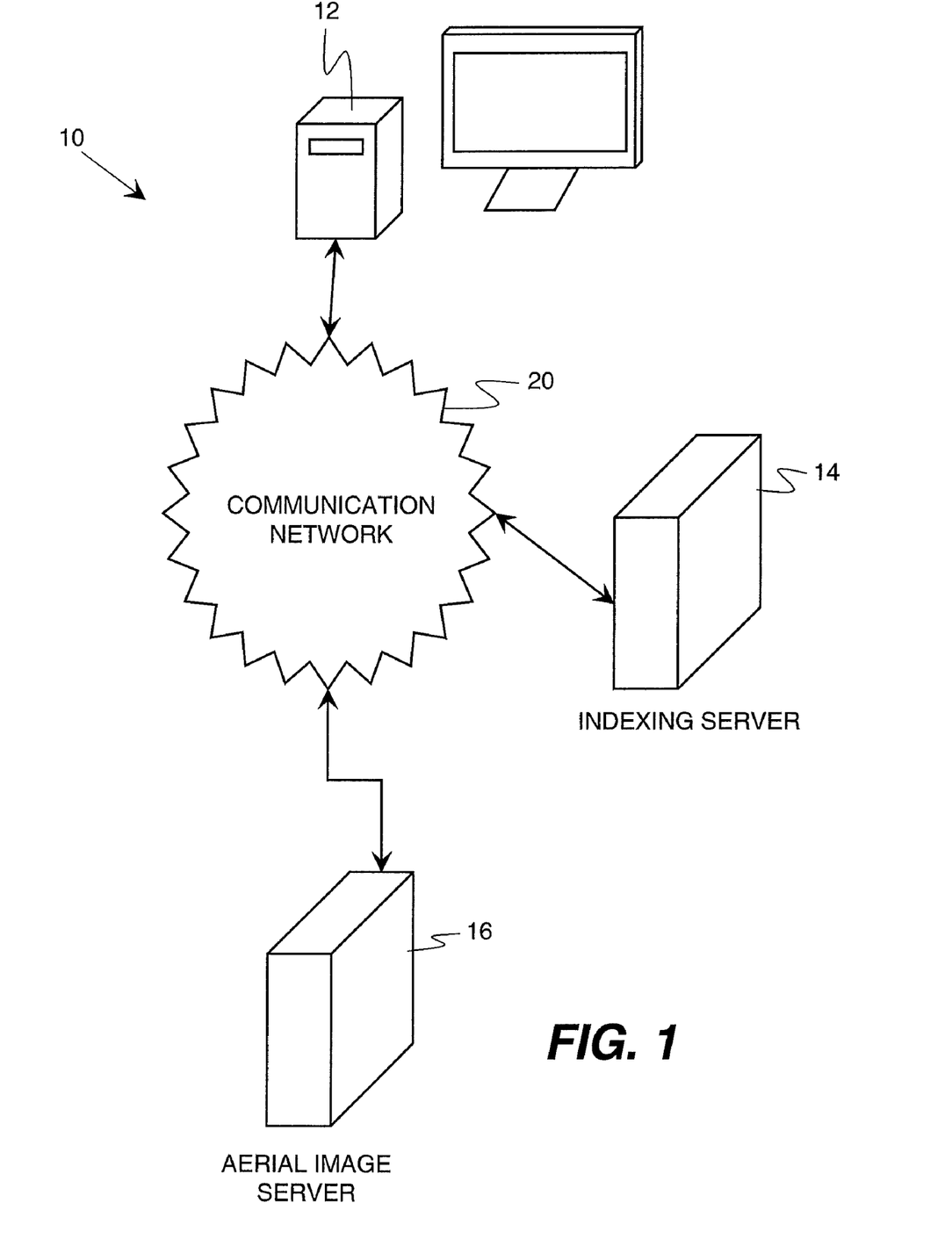
FIG. 1 is a pictorial of a system that can make use of the present invention.

In FIG. 1, system 10 is shown with the elements necessary to practice the current invention including computing device 12, indexing server 14, aerial image server 16, and communication network 20. Computing device 12 can be a personal computer for storing images where images will be understood to include both still and moving or video images. Computing device 12 communicates with a variety of devices such as digital cameras or cell phone cameras (not shown) for the purpose of storing images captured by these devices. These captured images can further include location information such as GPS data provided by the capturing device. Computing device 12 can also communicate through communication network 20 to an internet service that uses images captured without location information and allows the user to add location information to the images. In either case, images with location information are well known in the art.

Indexing server 14 is another computer processing device available on communication network 20 for the purposes of executing the algorithms in the form of computer instructions that analyze the content of images for semantic information such as event type. It will be understood that providing this functionality in system 10 as a web service via indexing server 14 is not a limitation of the invention. Computing device 12 can also be configured to execute the algorithms responsible for the analysis of images provided for indexing.

Aerial image server 16 communicates with other computing devices via communication network 20 and upon request, aerial image server 16 provides an aerial image correlated to the provided location information. Aerial images stored on aerial image server 16 are captured by a variety of manned aircraft including airplanes or unmanned aircraft including satellites. Aerial images can be captured from cameras that look directly down or orthogonally to a specific altitude or they can be captured obliquely to preserve third dimensional information of the captured image. Pictometry International Corp. is one company that provides obliquely captured aerial images correlated to location information. Well known internet services provide satellite aerial images correlated to provided location information such as physical address, GPS data, or other forms of location information such as the name of a business that has a known location. Aerial images can have metadata associated with them, which can be stored in association with the aerial images on the aerial image server. Metadata associated with the aerial images can include information such as names of businesses located within the physical area represented by the image, historical landmarks, parks, and much more. These metadata can be provided with an aerial image upon request. Aerial images are also provided in a variety of resolutions representing capture or simulated capture from a specific altitude. High resolution aerial images show more detail and are typically more expensive to acquire. High resolution aerial images are larger files requiring more bandwidth and hence time to transmit.

Figure 2:
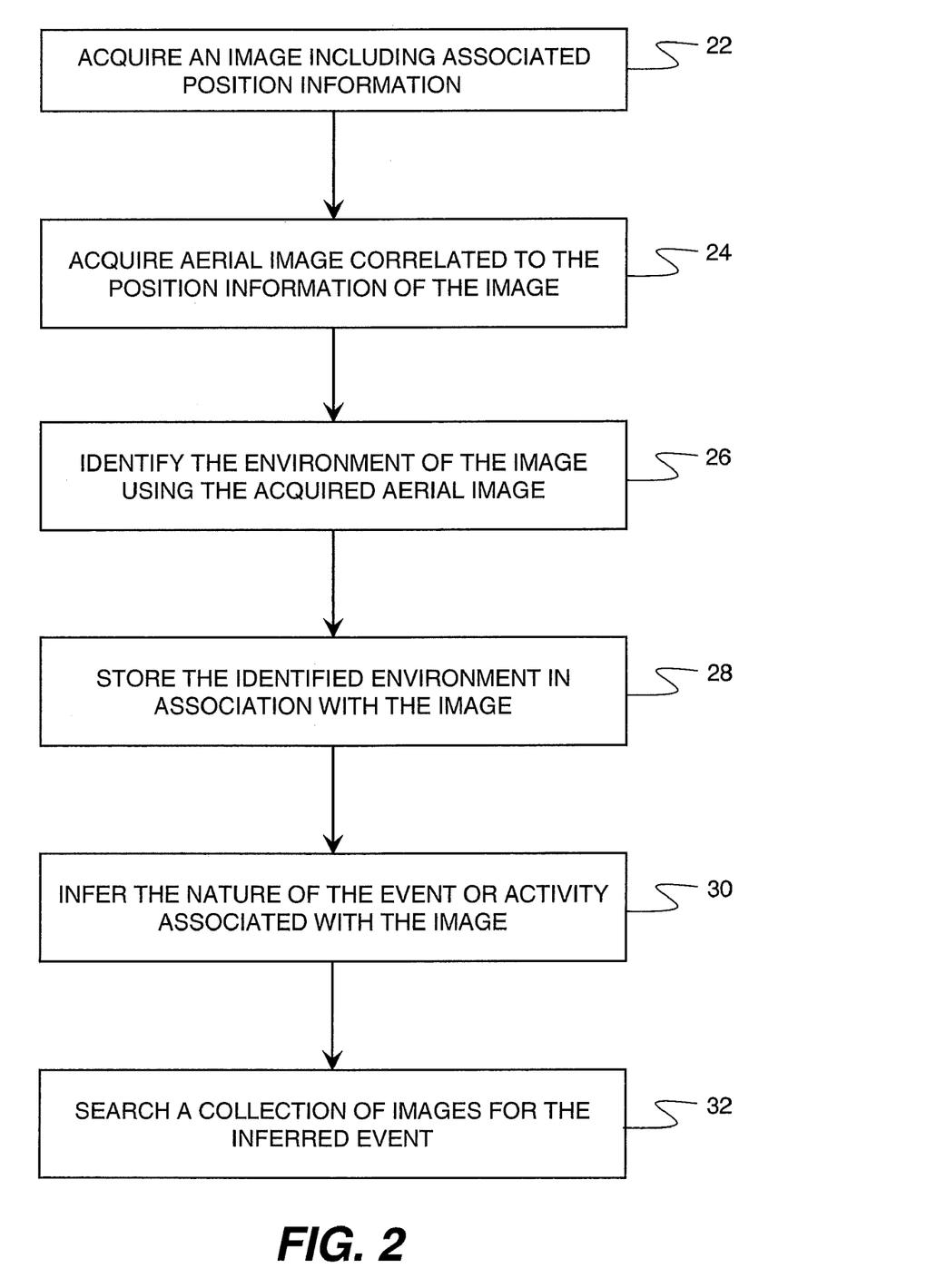
FIG. 2 is a flow chart for practicing an embodiment of the invention.

In FIG. 2, a process diagram is illustrated showing the sequence of steps necessary to practice the invention. In step 22, an image is acquired that includes associated location information such as GPS data. The location information is preferably associated with the image in the form of metadata, but can be merely supplied in association with the image without deviating from the scope of the invention. The image can be provided by computing device 12 from its internal storage or from any storage device or system accessible by computing device 12 such as a local network storage device or an online image storage site. Using the location information provided in step 22, computing device 12 provides the location information to aerial image server 16 in step 24 to acquire an aerial image correlated to the location information associated with the image.

Using the acquired aerial image of step 24, computing device 12 identifies the environment of the image in step 26 using classifiers in the following manner. Recently, many people have shown the efficacy of representing an image as an unordered set of image patches or "bag of visual words" (F.-F. Li and P. Perona, A Bayesian hierarchical model for learning natural scene categories, Proceedings of CVPR, 2005; S. Lazebnik, C. Schmid, and J. Ponce, Beyond bags of features: spatial pyramid matching for recognizing natural scene categories, Proceedings of CVPR, 2006). Suitable descriptions (e.g., so called SIFT descriptors) are computed for each of training images, which are further clustered into bins to construct a "visual vocabulary" composed of "visual words." The intention is to cluster the SIFT descriptors into "visual words" and then represent an image in terms of their occurrence frequencies in it. The well-known k-means algorithm is used with cosine distance measure for clustering these descriptors.

While this representation throws away the information about the spatial arrangement of these patches, the performances of systems using this type of representation on classification or recognition tasks are impressive. In particular, an image is partitioned by a fixed grid and represented as an unordered set of image patches. Suitable descriptions are computed for such image patches and clustered into bins to form a "visual vocabulary." In the present invention, the same methodology is adopted and it is extended to consider both color and texture features for characterizing each image grid.

To extract color features, an image grid is further partitioned into 2×2 equal size sub-grids. Then for each subgrid, one can extract the mean R, G, and B values to form a 4×3=12 feature vector which characterizes the color information of 4 sub-grids. To extract texture features, one can apply a 2×2 array of histograms with 8 orientation bins in each sub-grid. Thus a 4×8=32-dimensional SIFT descriptor is applied to characterize the structure within each image grid, similar in spirit to Lazebnik et al. In a preferred embodiment of the present invention, if an image is larger than 200,000 pixels, it is first resized to 200,000 pixels. The image grid size is then set to 16×16 with overlapping sampling interval 8×8. Typically, one image generates 117 such grids.

After extracting all the raw image features from image grids, the present invention builds separate color and texture vocabularies by clustering all the image grids in the training dataset through k-means clustering. In the present invention, both vocabularies are set to size 500. By accumulating all the grids in the training set of images, one obtains two normalized histograms for an event, $h_c$ and $h_t$, corresponding to the word distribution of color and texture vocabularies, respectively.

Concatenating hc and ht, the result is a normalized word histogram of size 1000. Each bin in the histogram indicates the occurrence frequency of the corresponding word.

For each input aerial image that was obtained based on the location coordinates, both color and texture bags of words are computed as described above. The images corresponding to a particular type (or class) of environment form the training set for that class. The training sets of all the classes form the total training set. A classifier is trained using this training set.

In a preferred embodiment of the present invention, a classifier known as SAMME (by J. Zbu, S. Rosset, H. Zou, and T. Hastie. Multi-class Adaboost. Technique Report, 2005) is selected as the classifier for solving the multi-class problem. Compared with another algorithm called AdaBoost.MH, which needs to perform K one-against-all classifications, SAMME performs K-class classification directly. It only requires weak classifiers better than random guess (e.g. correct probability larger than 1/K), rather than better than ½ as the standard two-class AdaBoost requires.

For each input aerial image that needs to be classified, both color and texture bags of words are computed as described above. The trained classifier is applied to the bags of words of the input image to produce a class of the environment for the input image.

Figure 3:
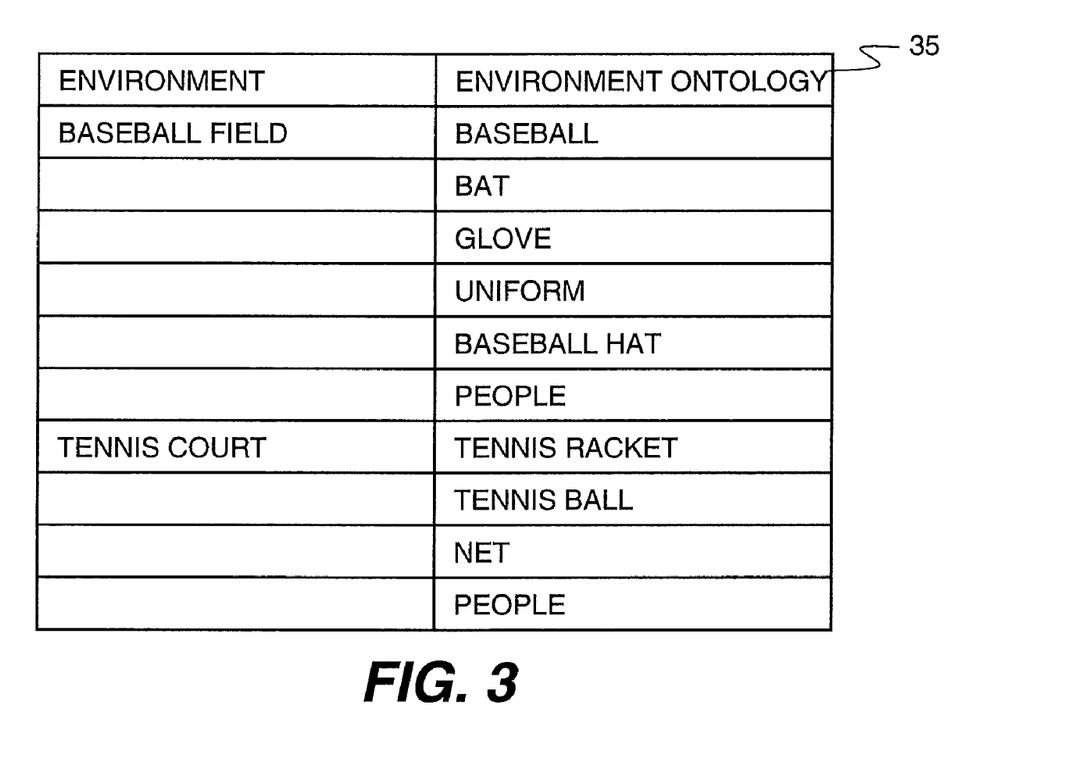
FIG. 3 is a table showing the ontological structure of example environment types.

It will be understood that some locations can have multiple environments. For example, Rotary Park on North Main Street in Honeoye Falls, N.Y. includes parking environments, picnic environments, fishing environments, and soccer environments. Broadly by way of example, but not limitation, identified environments can include baseball fields, football fields, tennis courts, golf courses, residential areas, commercial properties, schools, shopping malls, playgrounds, parks, beaches, forests, or theme parks. As shown in table 35 of FIG. 3, environments can have pre-established simplified environment ontologies associated with them. In both computer science and information science, an ontology is a data model that represents a set of concepts within a domain and the relationships between those concepts It is used to reason about the objects within that domain. In the example of FIG. 3, a very simplified ontology is shown for two example environments. Relationships are not shown between the concepts listed in FIG. 3, but if established can assist in the use of the ontology of the environment for inferring the nature of an activity or event.

Figure 4A:
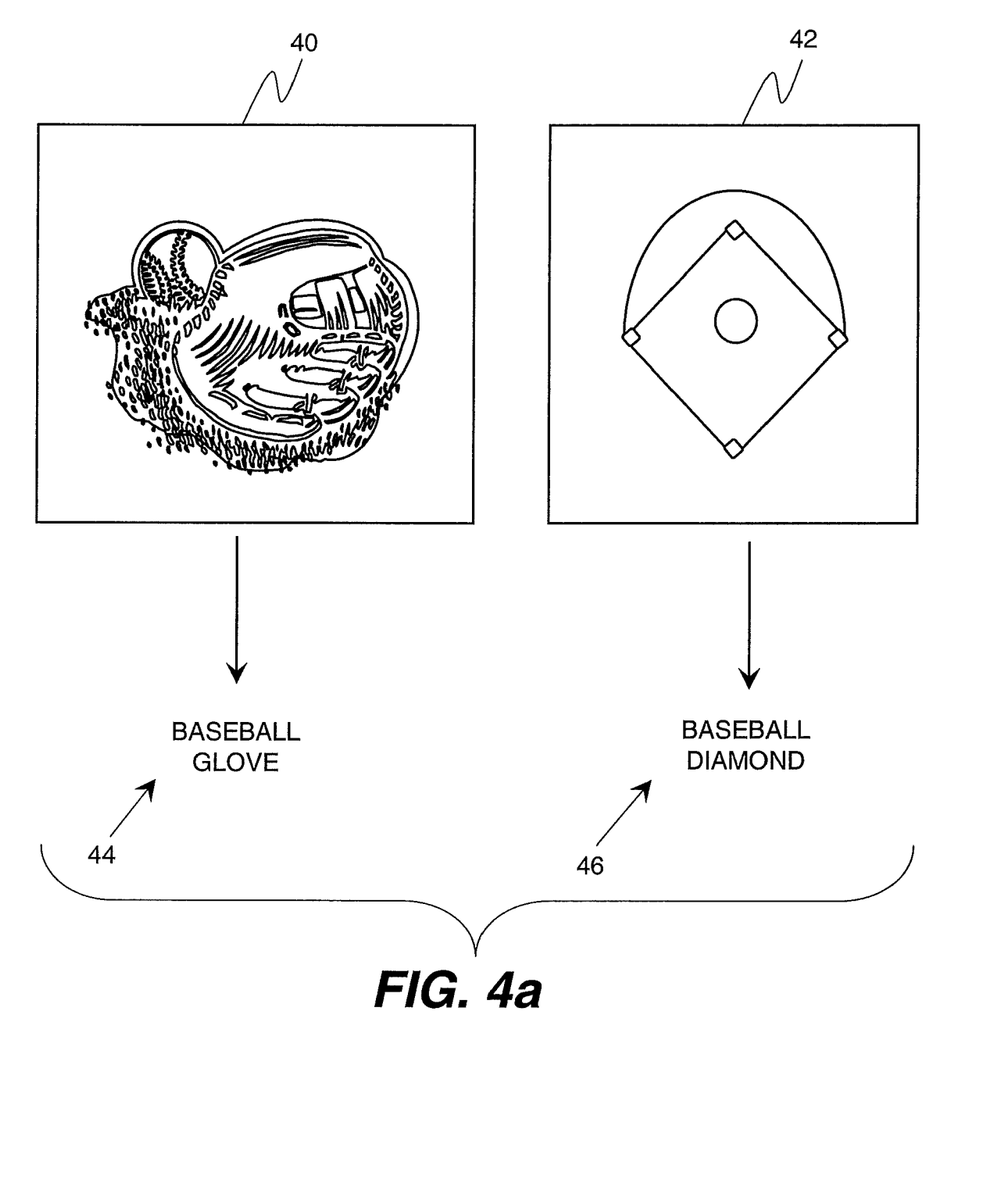
FIG. 4a and 4b depict examples of images and their corresponding aerial images of the environment.
Figure 4B:
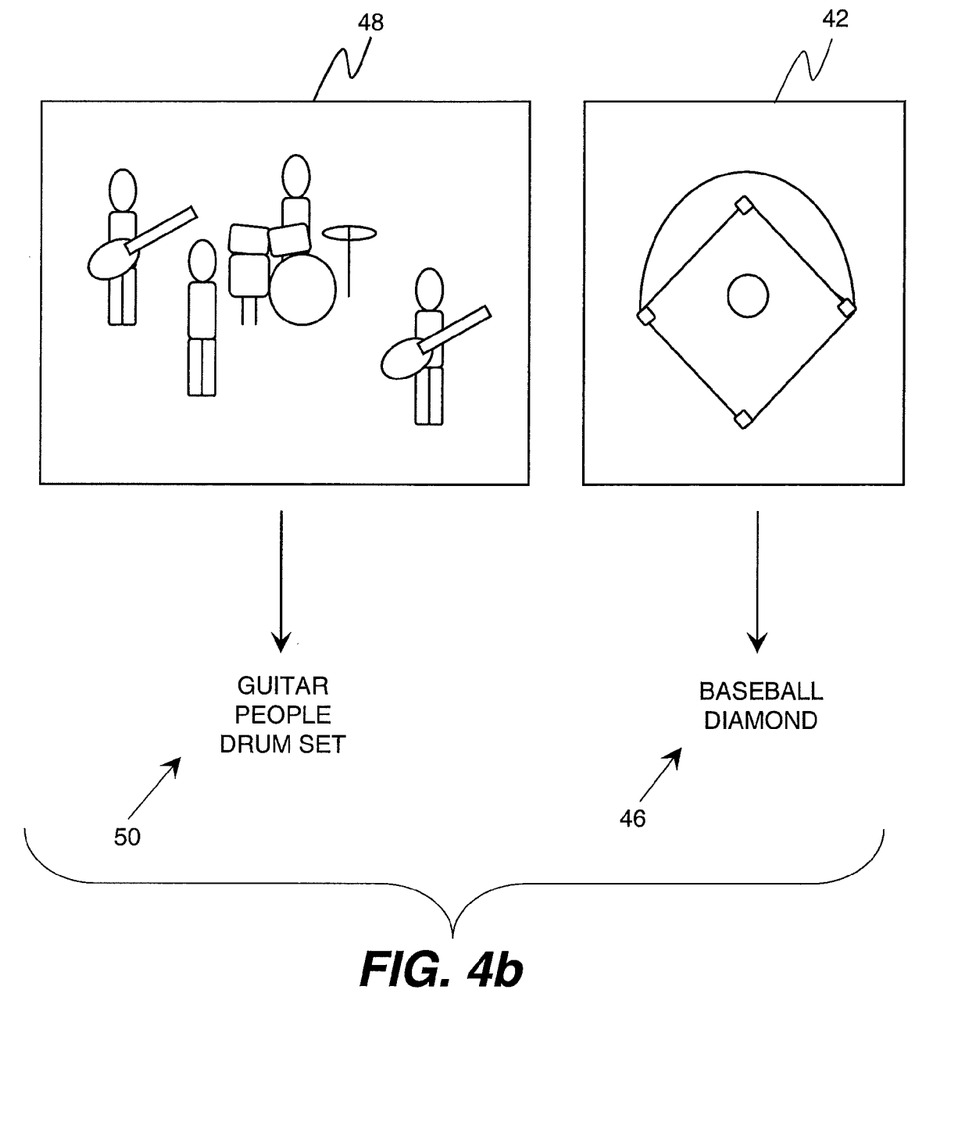

The identified environment of the image is then stored in association with the image in step 28. Preferably the identified environment is stored as metadata included with the image such as EXIF data, but the invention is not so limited. The identified environment can be stored as data in a database in association with the image. In step 30, inferences regarding the nature of the event or activity associated with the image are made from the stored environment of the image. Indexing server 14 or computing device 12 can infer from the stored environment of the image, for example a baseball field, that the nature of the event was a baseball game. This inference can lead to a valid classification of the event as a baseball game. If indexing server 14 can analyze the image as shown in FIG. 4a and detect the presence of a baseball glove and a baseball, then these objects also being found in the ontology of baseball field environment give more conclusive evidence that the event is properly classified as a baseball game. If however, as shown in FIG. 4b, objects such as guitar, people, and drum set are determined by analyzing the image and the environment is still a baseball field then the classification of the event as a baseball game is likely invalid. The proper inference, a concert, is made by looking at both the stored environment of the image and the image. If metadata have been provided with the aerial image, further information can be considered in combination with any of the other data when making the inference as to the nature of the event or activity associated with the image. Metadata provided with the acquired aerial image can be stored additively to the ontology of stored environment if desired for subsequent use.

Having inferred the nature of the activity or event allows computing device 12 to search a collection of images for the inferred event in step 32. The event type, the stored environment, the elements of the stored environment ontology or any metadata associated with the image or the aerial image may be used alone or in combination to frame the search of the collection of images. The collection of images to be searched may belong to the user of computing device 12 and resident thereon or it could be a public collection of images available for searching via communication network 20 with a tool such as Google™ Image search implemented by a web browser running on computing device 12. Another popular collection of images available for searching online with a web browser is maintained by FlickR™ at http://www.flickr.com where text tags are used to search for images.

In FIG. 4a, image 40 is shown along with acquired aerial image 42 provided by aerial image server 16 in response to the provision of location information associated with image 40. List 44 shows the objects determined from the indexing analysis of image 40 while list 46 shows the metadata associated with the acquired aerial image 42. The inference regarding the potential nature of the event being a baseball game is fairly conclusive and the terms in the list can be used to search for images in the collection that have similar content. Likewise in FIG. 4b, image 48 captured with the same location information at a different time and date is shown along with acquired aerial image 42. List 50 shows the objects determined from the indexing analysis of image 48. Comparing lists 50 and 46, the inference regarding the potential nature of the event as a baseball game is invalid. The conclusive inference of a concert is reached only upon consideration of both the stored environment of the image and the image.

In order to infer the event accurately, information from the images and the corresponding co-located aerial images can be fused at three levels: feature level, score level, and decision level. Feature level fusion requires concatenation of features from both image and the corresponding aerial image to form a unified feature vector. Score level fusion uses the output scores from multiple classifiers across all of the classes and feeds them to a fusion or meta classifier. Decision level fusion trains a fusion classifier that takes the prediction labels of both the image and the co-located aerial image classifiers.

Figure 5A:
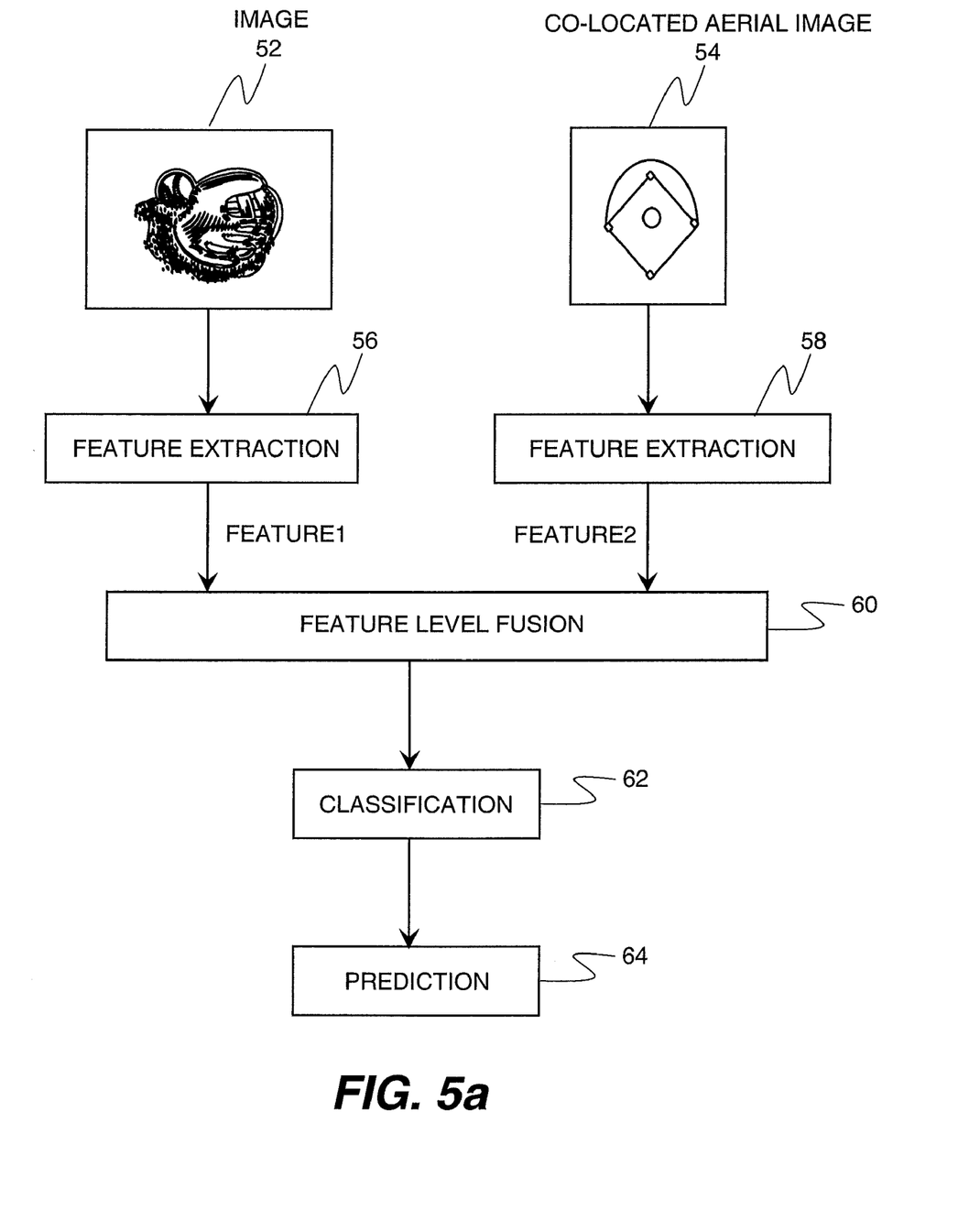
FIG. 5a depicts a block diagram of an embodiment of the present invention for identifying the event of the image using both the image and the acquired aerial image.

FIG. 5a depicts the feature level fusion as one embodiment of the invention. Image 52 is fed to a feature extractor 56 (using SIFT and color feature extraction approach as described previously) to obtain visual information (feature1). The corresponding co-located aerial image 54 is fed to another feature extractor 58 for visual feature (feature2) related to aerial images. Both image feature (feature1) and the co-located aerial image feature (feature2) are combined in the feature level fusion module 60 by simple concatenation. Using the fused feature, a trained classifier 62 will infer the event of the image and make prediction of the event category 64.

Figure 5B:
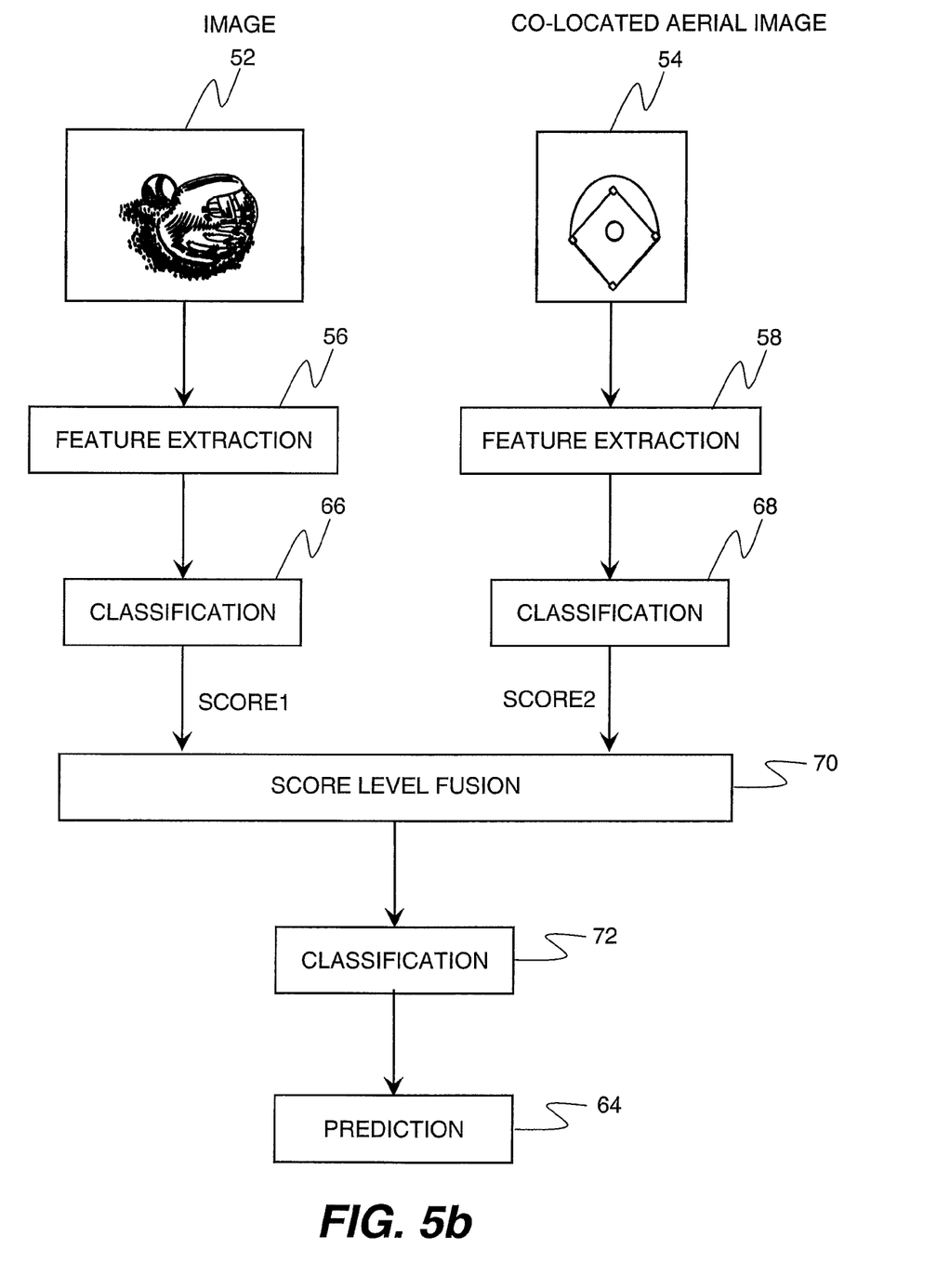
FIG. 5b depicts a block diagram of another embodiment of the present invention for identifying the event of the image using both the image and the acquired aerial image.

FIG. 5b depicts the score level fusion as a second embodiment of the invention. Image 52 is fed to a feature extractor 56 (using SIFT and color feature extraction approach as described previously) to obtain visual information. Classifier 66 uses only the image visual feature to infer the event of the image and output confidence related scores (score1) for each event category. The corresponding co-located aerial image 54 is fed to another feature extractor 58 for visual feature related to aerial images. Classifier 68 uses only the aerial image's visual feature to infer the event of the image and output another set of confidence related scores (score2). The scores of both image classifier 66 and corresponding aerial image classifier 68 are concatenated to form a fused score vector and fed to score level fusion module 70. Using the fused score, a trained classifier 72 will infer the event of the image and make prediction of the event category 64.

Figure 5C:
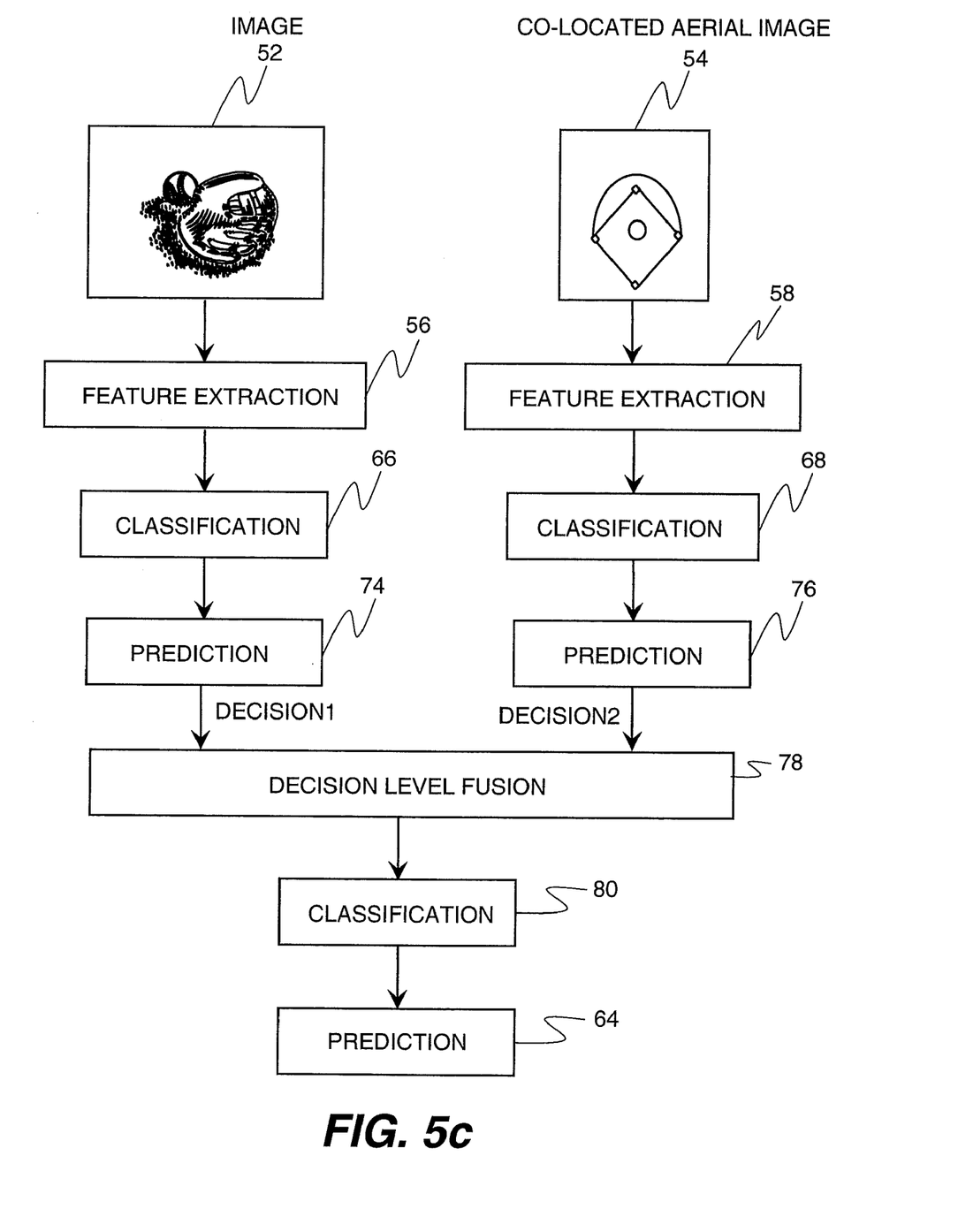
FIG. 5c depicts a block diagram of a still farther embodiment of the present invention for identifying the event of the image using both the image and the acquired aerial image.

FIG. 5c depicts the decision level fusion as a third embodiment of the invention. Image 52 is fed to a feature extractor 56 (using SIFT and color feature extraction approach as described previously) to obtain visual information. Classifier 66 uses only the image visual feature to infer the event depicted in the image and make prediction 74 of the most relevant event category based on the image (decision1). The corresponding co-located aerial image 54 is fed to another feature extractor 58 for visual feature related to aerial images. Classifier 68 uses only the aerial image's visual feature to infer the event shown in the image and make prediction 76 of the most relevant event category based on aerial image (decision2). Both image prediction 74 and corresponding aerial image prediction 76 are combined and fed to a decision level fusion module 78. Using the fused decision, a trained classifier 80 will infer the event of the image and make prediction of the event category 64.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

PARTS LIST 10 system
12 computing device
14 indexing server
16 aerial image server
20 communication network
22 step
24 step
26 step
28 step
30 step
32 step
35 table
40 image
42 acquired aerial image
44 list
46 list
48 image
50 list
52 image acquiring step
54 co-located aerial image acquiring step
56 image feature extraction step
58 co-located aerial image feature extraction step
60 feature level fusion step
62 classifier trained on features of images
64 classifier prediction based on image and co-located aerial image
66 classifier trained on features of images
68 classifier trained on features of co-located aerial images
70 score level fusion step
72 score level classifier 74 classifier prediction based on image
76 classifier prediction based on co-located aerial image
78 decision level fusion
80 classifier trained on prediction output of image and co-located aerial image classifiers

The invention claimed is:

1. A method of recognizing an event depicted in digital image from the digital image and a location information associated with the digital image, comprising:
   a) acquiring the digital image and its associated location information;
   b) using the location information to acquire outdoor digital aerial images correlated to the location information, wherein the acquired outdoor digital aerial images are satellite images or an images acquired from aircraft, and selecting the appropriate resolution from the acquired outdoor digital aerial images needed to identify the event of the acquired digital images;
   c) using a computing device to identify the environment of the acquired digital image by analyzing the acquired outdoor digital aerial image;
   d) classifying the event using both the acquired digital image and the identified environment of the selected appropriate resolution acquired outdoor digital aerial image, further including:
   i) extracting features from the image and the aerial image(s),
   ii) combining the features, and
   iii) classifying the event depicted in the image using the combined features; and
   e) storing the classified event in association with the acquired digital image for subsequent use.

2. The method of claim 1, wherein step b) includes acquiring the aerial image(s) at a plurality of resolutions.

3. The method of claim 1, wherein the event includes baseball games, football games, tennis games, golfing, residential activities, commercial activities, school activities, shopping, playground activities, park activities, beach activities, hiking, or theme park visits.

4. The method of claim 1, further comprising:
   e) applying steps a) to d) a plurality of times to a plurality of images; and
   f) searching the plurality of images based on the stored events for images of a particular event.

5. The method of claim 1, further comprising acquiring metadata associated with the acquired aerial image(s) and storing such metadata for subsequent use in association with the stored event.

6. The method of claim 5, further comprising:
   g) applying steps a) to d) a plurality of times to a plurality of images; and
   h) searching the plurality of images based on the stored events for images of a particular event.

7. A method of recognizing an event depicted in digital image from the digital image and a location information associated with the digital image, comprising:
   a) acquiring the digital image and its associated location information;
   b) using the location information to acquire outdoor digital aerial images correlated to the location information, wherein the acquired outdoor digital aerial images are satellite images or an images acquired from aircraft, and selecting the appropriate resolution from the acquired outdoor digital aerial images needed to identify the event of the acquired digital images;
   c) using a computing device to identify the environment of the acquired digital image by analyzing the acquired outdoor digital aerial image;
   d) classifying the event using both the acquired digital image and the identified environment of the selected appropriate resolution acquired outdoor digital aerial image, further including:
   i) producing a first score from the image using a first pre-defined image classifier,
   ii) producing a second score from the aerial image(s) using a second predefined image classifier, and
   iii) combining the first and the second scores to classify the event depicted in the image, and
   e) storing the classified event in association with the acquired digital image for subsequent use.

8. A method of recognizing an event depicted in digital image from the digital image and a location information associated with the digital image, comprising:
   a) acquiring the digital image and its associated location information;
   b) using the location information to acquire outdoor digital aerial images correlated to the location information, wherein the acquired outdoor digital aerial images are satellite images or an images acquired from aircraft, and selecting the appropriate resolution from the acquired outdoor digital aerial images needed to identify the event of the acquired digital images;
   c) using a computing device to identify the environment of the acquired digital image by analyzing the acquired outdoor digital aerial image;
   d) classifying the event using both the acquired digital image and the identified environment of the selected appropriate resolution acquired outdoor digital aerial image, further including:
   i) producing a first decision from the image using a first pre-defined image classifier,
   ii) producing a second decision from the aerial image(s) using a second pre-defined image classifier, and
   iii) combining the first and the second decisions to classify the event depicted in the image, and
   e) storing the classified event in association with the acquired digital image for subsequent use.

* * * * *

UNITED STATES PATENT AND TRADEMARK OFFICE
CERTIFICATE OF CORRECTION

PATENT NO. : 8,391,617 B2  
APPLICATION NO. : 12/264277  
DATED : March 5, 2013  
INVENTOR(S) : Yu et al.

Page 1 of 1

It is certified that error appears in the above-identified patent and that said Letters Patent is hereby corrected as shown below:

On the Title Page

Item (56), under "OTHER PUBLICATIONS", in Column 2, Line 1, delete "NLP-Canada" and insert -- Canada --, therefor.

Item (56), under "OTHER PUBLICATIONS", in Column 2, Line 2, delete "NLP-Carleer" and insert -- Carleer --, therefor.

Item (56), under "OTHER PUBLICATIONS", in Column 2, Line 4, delete "NLP-gizmodo.com" and insert -- Gizmodo.com --, therefor.

In the Specification

In Column 2, Line 5, delete "FIG." and insert -- FIGS. --, therefor.

In Column 2, Line 13, delete "farther" and insert -- further --, therefor.

In Column 4, Line 1, delete "hc and ht," and insert -- $h_c$ and $h_t$, --, therefor.

In Column 4, Line 11, delete "J. Zbu," and insert -- J. Zhu, --, therefor.

In Column 4, Line 38, delete "concepts" and insert -- concepts. --, therefor.

In the Claims

In Column 8, Line 24, in Claim 7, delete "image, and" and insert -- image; and --, therefor.

In Column 8, Line 51, in Claim 8, delete "image, and" and insert -- image; and --, therefor.

Signed and Sealed this  
Eleventh Day of March, 2014

Michelle K. Lee  
*Deputy Director of the United States Patent and Trademark Office*